US012746694B2

(12) United States Patent
Li et al.

(10) Patent No.: US 12,746,694 B2
(45) Date of Patent: Sep. 29, 2026

(54) PICKING DEVICE

(71) Applicant: PEGATRON CORPORATION, Taipei City (TW)

(72) Inventors: Chuan-Fu Li, Taipei City (TW); Bo-Ciang Liao, Taipei City (TW); Jen-Hui Wang, Taipei City (TW); Chao-Chien Lee, Taipei City (TW)

(73) Assignee: PEGATRON CORPORATION, Taipei City (TW)

( * ) Notice: Subject to any disclaimer, the term of this patent is extended or adjusted under 35 U.S.C. 154(b) by 585 days.

(21) Appl. No.: 18/474,577

(22) Filed: Sep. 26, 2023

(65) Prior Publication Data

US 2024/0217121 A1 Jul. 4, 2024

(30) Foreign Application Priority Data

Dec. 30, 2022 (TW) ................................ 111150915

(51) Int. Cl.
*B25J 15/06* (2006.01)

(52) U.S. Cl.
CPC ................................ *B25J 15/0616* (2013.01)

(58) Field of Classification Search
CPC .... B25J 15/06; B25J 15/0616; B25J 15/0633; B25J 15/0683
See application file for complete search history.

(56) References Cited

FOREIGN PATENT DOCUMENTS

| | | | | |
|---|---|---|---|---|
| CN | 217200781 U | | 8/2022 | |
| EP | 4389369 A1 | * | 6/2024 | .......... B25J 15/0616 |
| JP | H06198523 A | | 7/1994 | |
| TW | 201641399 A | | 12/2016 | |
| TW | 201829274 A | | 8/2018 | |

OTHER PUBLICATIONS

Machine Translation of EP-4389369-A1 (Year: 2026).*

* cited by examiner

*Primary Examiner* — Gilbert Y Lee
(74) *Attorney, Agent, or Firm* — MUNCY, GEISSLER, OLDS & LOWE, P.C.

(57) ABSTRACT

The present disclosure provides a picking device which is suitable for absorbing at least one material. The picking device includes a vacuum source and a picking mechanism. The vacuum source is configured to pump air so as to provide negative pressure. The picking mechanism is connected with the vacuum source and includes a main body and a plurality of picking assemblies which are movably arranged on the main body. The main body is provided with a plurality of air channels for connecting the vacuum source and the picking assemblies respectively. Each picking assembly includes a picking piece, a moving piece and a blocking piece; the picking pieces and the moving pieces penetrate through the main body at intervals and pass through the corresponding air channels; the moving pieces are provided with air vents for moving along with the blocking pieces so as to communicate with the air channels.

10 Claims, 8 Drawing Sheets

PICKING DEVICE

CROSS REFERENCE TO RELATED APPLICATIONS

This application claims the priority benefit of Taiwan applications serial no. 111150915, filed on Dec. 30, 2022. The entirety of the above-mentioned patent application is hereby incorporated by reference herein and made a part of this specification.

BACKGROUND

Technical Field

The present disclosure relates to a device, and particularly relates to a picking device capable of absorbing materials.

Description of Related Art

With the development of technologies, picking devices, such as mechanical arms, are mostly used in automatic production lines for picking materials. In order to meet the requirement for productivity, the picking devices are usually equipped with a plurality of sets of suction modules to simultaneously pick up various materials, thereby increasing the efficiency of the production lines. In addition, during the operation of the picking device, the heights of materials may be different (e.g., defective products may lack some parts, or there may be variations in height due to different products types). To address this, air cylinders are commonly integrated. The air cylinders of the suction modules only extend during materials absorption, thereby avoiding any mechanism interference with other modules during retraction.

On the basis of an existing method, each suction module of the picking device will be equipped with a set of vacuum electromagnetic valves (to generate negative pressure from a vacuum source) and corresponding electromagnetic valves (for the air cylinders). Each air cylinder will be provided with two air pipes and two sensing lines, and each vacuum electromagnetic valve will be provided with one air pipe and a corresponding wire. Therefore, problems that an existing picking device is provided with too many pipelines and wires and is high in cost are existing. Consequently, there are issues with the existing picking device, as it is equipped with an excessive number of pipelines and wires, resulting in high costs.

Thus, the quest to devise a picking device that significantly reduces the quantity of utilized pipelines and wires, while still meeting productivity and cost reduction requirements, has become a vital challenges in the industry.

SUMMARY

In view of the above, an objective of the present disclosure is to provide a picking device that can greatly reduce the used pipelines and wires, while meeting the requirements for productivity and cost reduction.

In order to achieve the above objective, the present disclosure provides a picking device which is suitable for absorbing at least one material. The picking device includes a vacuum source and a picking mechanism. The vacuum source is configured to pump air so as to provide negative pressure. The picking mechanism is connected with the vacuum source and includes a main body and a plurality of picking assemblies which are movably arranged on the main body. The main body is provided with a plurality of air channels for connecting the vacuum source and the picking assemblies respectively. Each picking assembly includes a picking piece, a moving piece and a blocking piece. The picking pieces and the moving pieces penetrate through the main body at intervals and pass through the corresponding air channels. The blocking pieces are connected with first ends of the picking pieces and the moving pieces respectively. Second ends of the picking pieces are provided with chucks which are connected with the corresponding air channels. The moving pieces are provided with air vents which move alongside the blocking pieces to communicate with the air channels. When the picking pieces exert pressure on the materials to push the blocking pieces and drive the moving pieces to move, and the air vents of the moving pieces communicate with the corresponding air channels. The communication allows the vacuum source to generate negative pressure through the air channels, enabling the chucks of the picking pieces to absorb the materials.

In one example, the blocking pieces are fixedly connected with the first ends of the moving pieces, and the blocking pieces are separately connected with the first ends of the picking pieces.

In one example, the picking mechanism further includes a driving piece and a stopping piece, and the driving piece is connected with the stopping piece.

In one example, the moving pieces are further provided with a plurality of clamping grooves; and when the chucks of the picking pieces absorb the materials, the driving piece pushes the stopping piece to clamp one of the clamping grooves, and thus the air vents of the moving pieces are kept in communication with the corresponding air channels.

In one example, the moving pieces are further provided with a plurality of clamping grooves; and when the chucks of the picking piece do not press the materials, the driving piece pushes the stopping piece to clamp one of the clamping grooves, and thus the moving pieces block the corresponding air channels.

In one example, when the chucks of the picking pieces absorb the materials, and the blocking pieces are separated from the first ends of the picking pieces, the air vents of the moving pieces are still kept in communication with the corresponding air channels.

In one example, each picking assembly further includes a guide shaft and a first elastic piece; the guide shafts penetrate through the first elastic pieces; and two ends of the guide shafts are connected with the main body and the second ends of the moving pieces respectively.

In one example, each picking assembly further includes a second elastic piece; and the picking pieces penetrate through the second elastic pieces.

In one example, each picking assembly further includes an air pipe joint, and the air pipe joint is connected with the main body and communicates with the corresponding air channel.

In one example, the picking device further includes an air path distributor; the air path distributor is provided with a first outlet/inlet, and a plurality of second outlets/inlets which communicate with the first outlet/inlet respectively; the first outlet/inlet is connected with the vacuum source; and each second outlet/inlet communicates with the corresponding air channel of the main body through the corresponding air pipe joint.

In view of the above, in the picking device according to the present disclosure, the vacuum source is configured to pump air so as to provide the negative pressure; the picking mechanism includes the main body and the plurality of picking assemblies which are movably arranged on the main body; the main body is provided with the plurality of air channels for connecting the vacuum source and the picking assemblies respectively; the picking pieces and the moving pieces of the picking assemblies penetrate through the main body at intervals and pass through the corresponding air channels; the blocking pieces of the picking assemblies are connected with the first ends of the picking pieces and the moving pieces respectively; the second ends of the picking pieces are provided with the chucks connected with the corresponding air channels; the moving pieces are provided with the air vents for moving along with the blocking pieces so as to communicate with the air channels; and when the picking pieces press the materials to push the blocking pieces and drive the moving pieces to move, and the air vents of the moving pieces communicate with the corresponding air channels, the vacuum source enables the chucks of the picking pieces to generate negative pressure through the air channels so as to absorb the materials. Therefore, in this structural design, the picking device according to the present disclosure can greatly reduce the used pipelines and wires, while meeting the requirements for productivity and cost reduction.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION

Figure 1A:
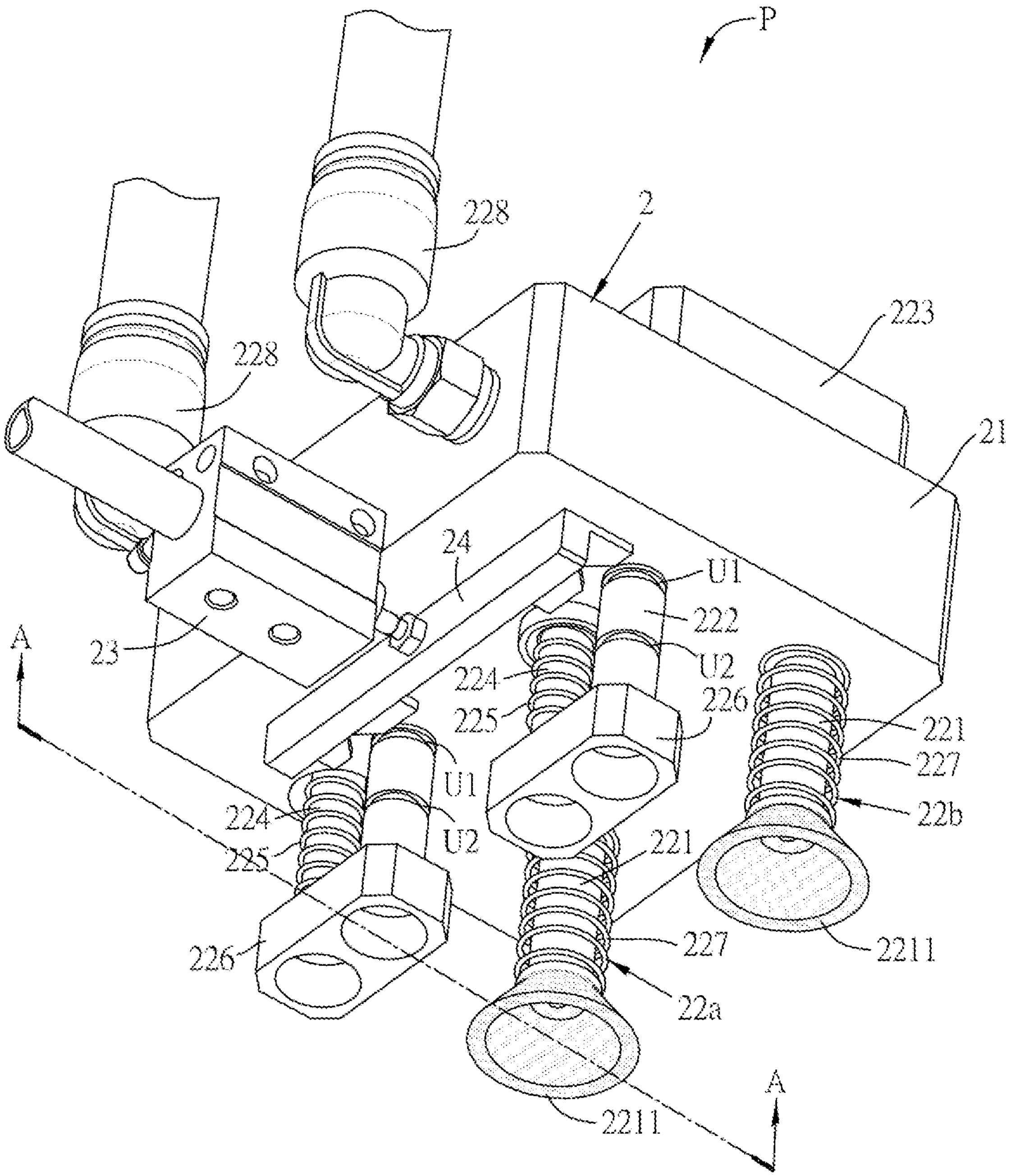
FIG. 1A and FIG. 1C are different schematic diagrams of a picking device according to an example of the present disclosure.

A picking device according to an example of the present disclosure will be described below with reference to related drawings. The same elements will be described with the same reference numerals. The elements in the following examples are only used for illustrating their relative relationship, and do not represent the proportion or size of real elements.

Figure 1B:
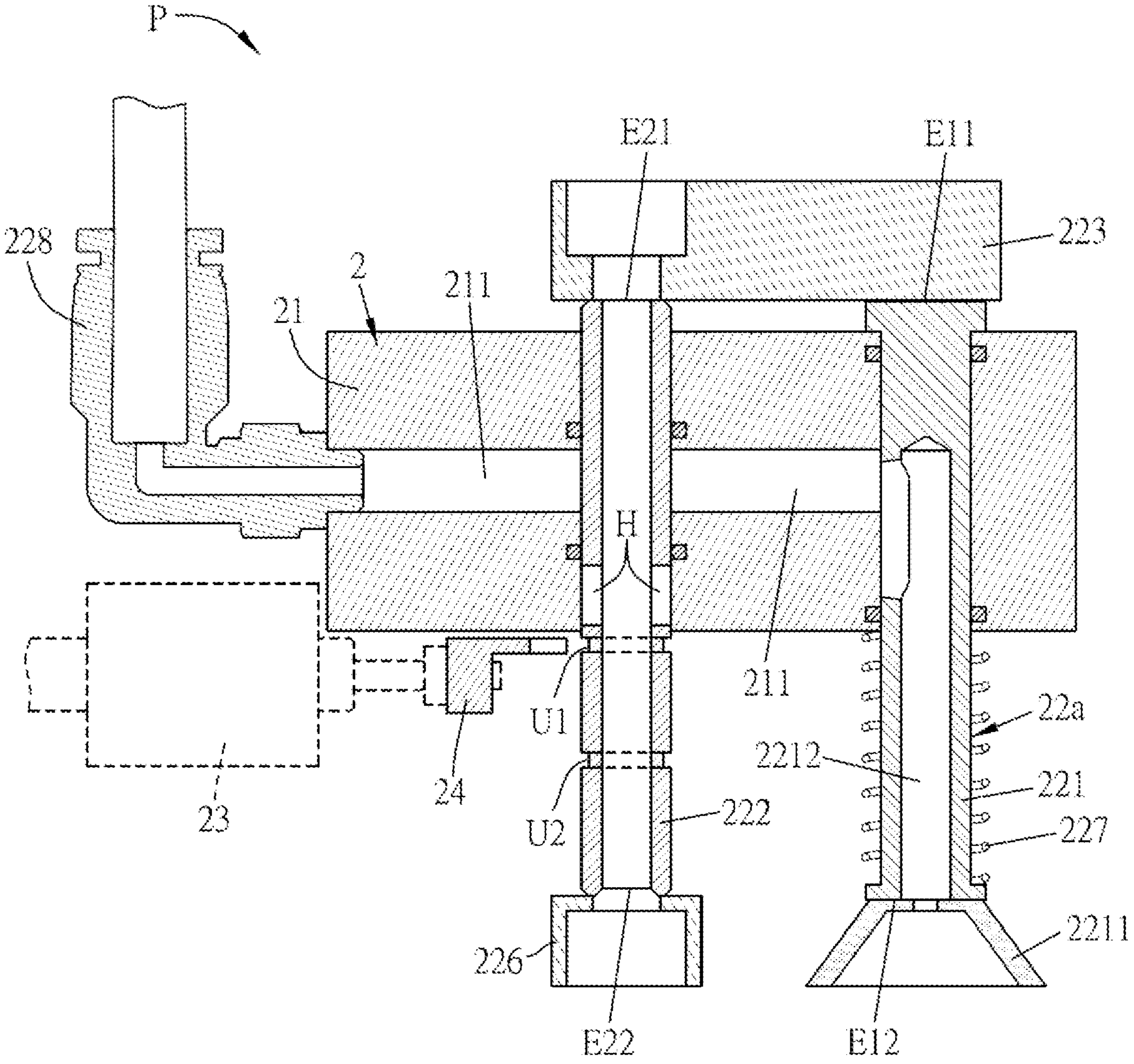
FIG. 1B is a schematic cross-sectional view of a picking device taken along line A-A in FIG. 1A.
Figure 1C:
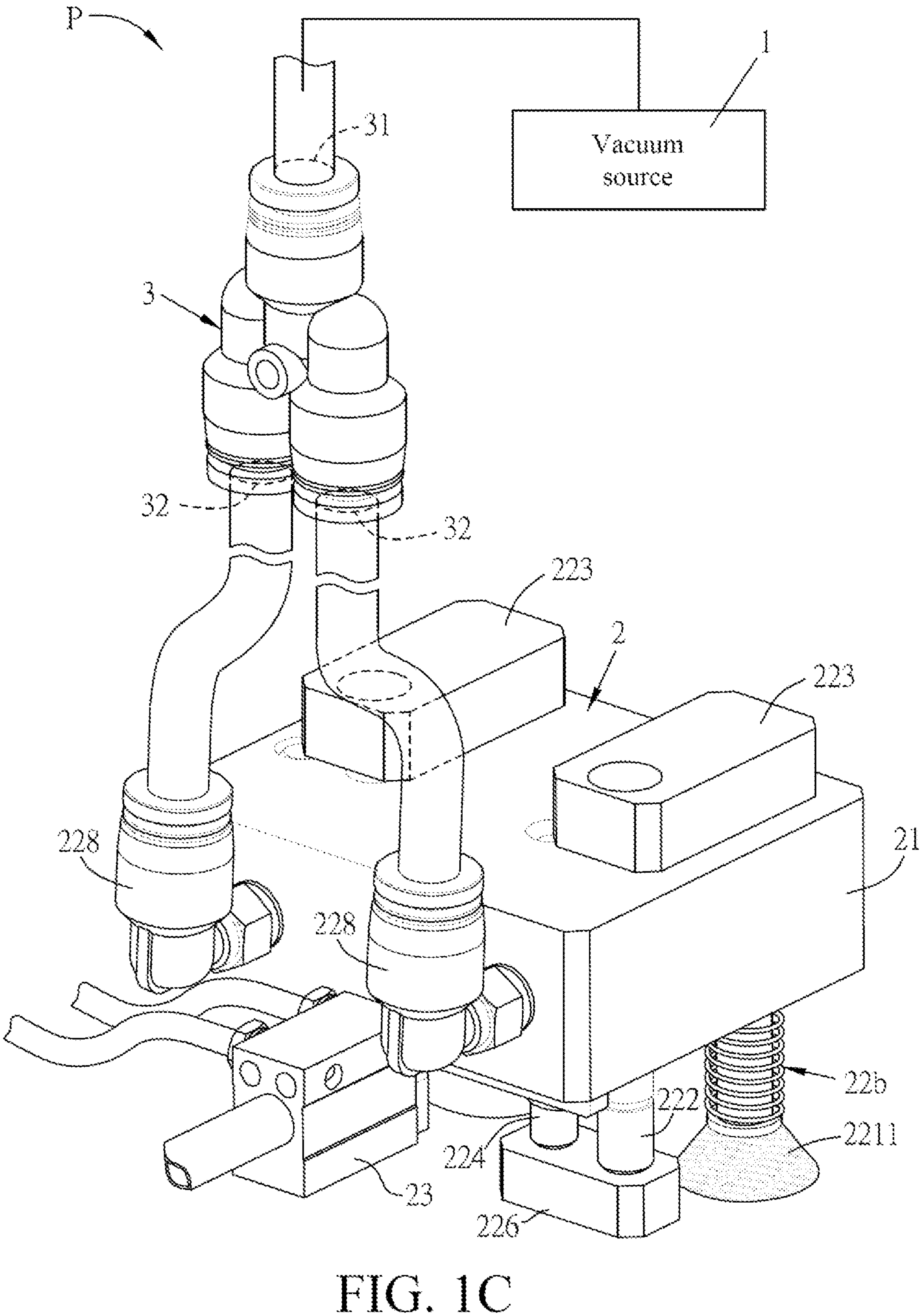

FIG. 1A and FIG. 1C are different schematic diagrams of a picking device according to an example of the present disclosure. FIG. 1B is a schematic cross-sectional view of a picking device taken along line A-A in FIG. 1A. FIG. 2A to FIG. 3B are schematic diagrams of operation of a picking device according to an example of the present disclosure. FIG. 1A, FIG. 1C and FIG. 2B are three-dimensional schematic diagrams. FIG. 1B, FIG. 2A, FIG. 2C, FIG. 3A to FIG. 3B are schematic cross-sectional views.

As shown in FIG. 1A to FIG. 1C, a picking device P includes a vacuum source 1 and a picking mechanism 2. The vacuum source 1 is configured to pump air to provide negative pressure. In some examples, the vacuum source 1 includes, for example, a vacuum pump, a vacuum electromagnetic valve, a joint, a pipeline or combination thereof.

The picking mechanism 2 is connected with the vacuum source 1 and includes a main body 21 and a plurality of sets of picking assemblies; and the picking assemblies are movably arranged on the main body 21. In order to clearly describe the present disclosure, the picking mechanism 2 according to the example is exemplified by having 2 sets of picking assemblies 22*a* and 22*b*. It is to be understood that in order to meet the productivity requirement, more than 2 sets of the picking assemblies may be provided, for example, 4 sets, 6 sets, 8 sets, 12 sets or 16 sets, and therefore a plurality of materials may be absorbed at the same time, thereby improving the production efficiency.

In this example, the main body 21 is provided with a plurality of air channels 211; the air channels 211 are used for connecting the vacuum source 1 and the picking assemblies 22*a* and 22*b* respectively. As shown in FIG. 1B, the air channels 211 transversely extend and are positioned in the main body 21, and one set of picking assemblies 22*a* (or 22*b*) is correspondingly connected with one air channel 211. Each set of picking assemblies 22*a* and 22*b* may include a picking piece 221, a moving piece 222 and a blocking piece 223. The picking pieces 221 and the moving pieces 222 penetrate through the main body 21 at intervals and pass through the corresponding air channels 211, and each moving piece 222 is provided with an air vent H; and the air vent H moves along with the corresponding blocking piece 223 so as to communicate with the corresponding air channel 211. The picking pieces 221 and the moving pieces 222 longitudinally penetrate through the main body 21 side by side; and in some cases, the air vents H of the moving pieces 222 may move along with the blocking pieces 223 to communicate with the corresponding air channels 211 (detailed description in the following). In addition, the blocking pieces 223 are connected with first ends E11 of the picking pieces 221 and first ends E21 of the moving pieces 222 respectively, and second ends E12 of the picking pieces 221 are provided with chucks 2211 connected with the corresponding air channels 211. The chucks 2211 and the blocking pieces 223 are positioned on the opposite sides of the main body 21, the first ends E11 and the second ends E12 are the two opposite ends of the picking pieces 221 respectively, and the first ends E21 and second ends E22 are the two opposite ends of the moving pieces 222 respectively.

In this example, the picking pieces 221 and the moving pieces 222 movably penetrate through the main body 21 and pass through corresponding air channels 211; the blocking pieces 223 are in fixed connection (such as locked connection) with the first ends E21 of the moving pieces 222, but the blocking pieces 223 are separately connected with the first ends E11 of the picking pieces 221. Therefore, when the picking mechanism 2 moves downwards to enable the picking pieces 221 to press an object (such as a material M in FIG. 2A), the blocking pieces 223 may be pushed to move upwards, and the moving pieces 222 may be driven to move upwards while the blocking pieces 223 move upwards. However, as shown in FIG. 2C, when the first ends E11 of the picking pieces 221 are separated from the blocking pieces 223, the first ends E21 of the moving pieces 222 are still connected with the blocking pieces 223.

As shown in FIG. 1A, each set of picking assemblies 22*a* and 22*b* may further include a guide shaft 224 and a first elastic piece 225; the guide shafts 224 penetrate through the first elastic pieces 225, and two ends of the guide shafts 224 are respectively connected with the main body 21 and the second ends E22 of the moving pieces 222. The first elastic pieces 225 may provide elastic force for the moving pieces 222 to return to an initial position (the position that picking and moving are not performed is the initial position, shown as FIG. 1A and FIG. 1B); and the guide shafts 224 are connected with the second ends E22 of the moving pieces 222 through connecting pieces 226. In addition, each set of picking assemblies 22*a* and 22*b* may further include a second elastic piece 227; and the picking pieces 221 penetrate through the second elastic pieces 227. The second elastic pieces 227 may provide an elastic force for the picking pieces 221 to return to the initial position.

In this example, the picking mechanism 2 may further include a driving piece 23 and a stopping piece 24, and the driving piece 23 is connected with the stopping piece 24. Rod bodies of the moving pieces 222 in this example are provided with 2 clamping grooves U1 and U2 for example; when the driving piece 23 drives the stopping piece 24 to move, the stopping piece 24 may clamp the clamping grooves U1 or the clamping grooves U2 of the moving pieces 222, and therefore the positions of the moving pieces 222 on the main body 21 will be fixed, and the moving pieces 222 will be prevented from returning to the initial position due to the elastic force of the first elastic pieces 225. The driving piece 23 is, for example, but not limited to a pneumatic cylinder or a pneumatic motor, and the stopping piece 24 may be a clamping plate for example.

As shown in FIG. 1C, each set of picking assemblies 22*a* and 22*b* may further include an air pipe joint 228; the air pipe joints 228 are connected with the main body 21, and the air pipe joints 228 communicate with the corresponding air channels 211 of the picking assembly 22*a* or 22 *b*. In addition, the picking device P in this example may further include an air path distributor 3; the air path distributor 3 is provided with a first outlet/inlet 31, and a plurality of second outlets/inlets 32 which communicate with the first outlet/inlet 31 respectively. The first outlet/inlet 31 is connected with the vacuum source 1, and each second outlet/inlet 32 respectively communicates with the corresponding air channel 211 of the main body 21 through each air pipe joint 228, so that the vacuum source 1 may provide negative pressure for the corresponding air channels 211 through the air path distributor 3 and the corresponding air pipe joints 228 so as to provide negative pressure for corresponding chucks 2211 of the picking pieces 221. The number of the second outlets/inlets 32 is the same as that of the air pipe joints 228, the air channels 211 and the picking assemblies (the number is 2 in this example); the first outlet/inlet 31 of the air path distributor 3 may be connected with the vacuum source 1 through a pipeline; and each second outlet/inlet 32 may be respectively connected with the corresponding air pipe joint 228 and the corresponding air channel 211 through pipelines. Therefore, when the vacuum source 1 pumps air, the corresponding air channels 211 may be in a negative pressure state through the air path distributor 3 and the air pipe joints 228 of the picking assemblies 22*a* and 22*b*; and in some cases, the corresponding chucks 2211 of the picking pieces 221 may also generate negative pressure to absorb the materials (detailed description in the following). In some examples, the air pipe joints 228 and the air path distributor 3 are both quick joints.

Figure 2A:
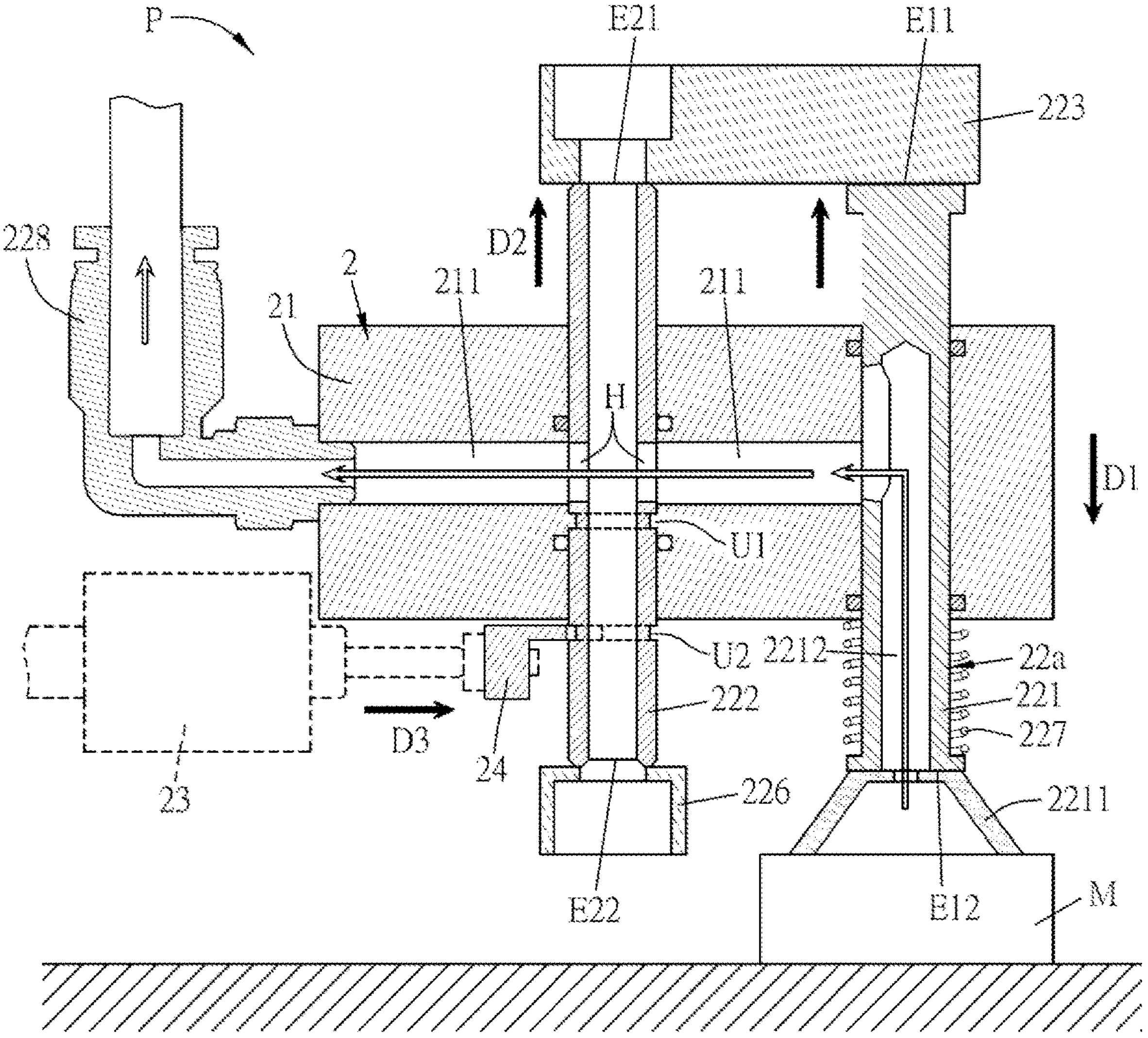
FIGS. 2A-2C and FIGS. 3A-3B are schematic diagrams of operation of a picking device according to an example of the present disclosure.
Figure 2B:
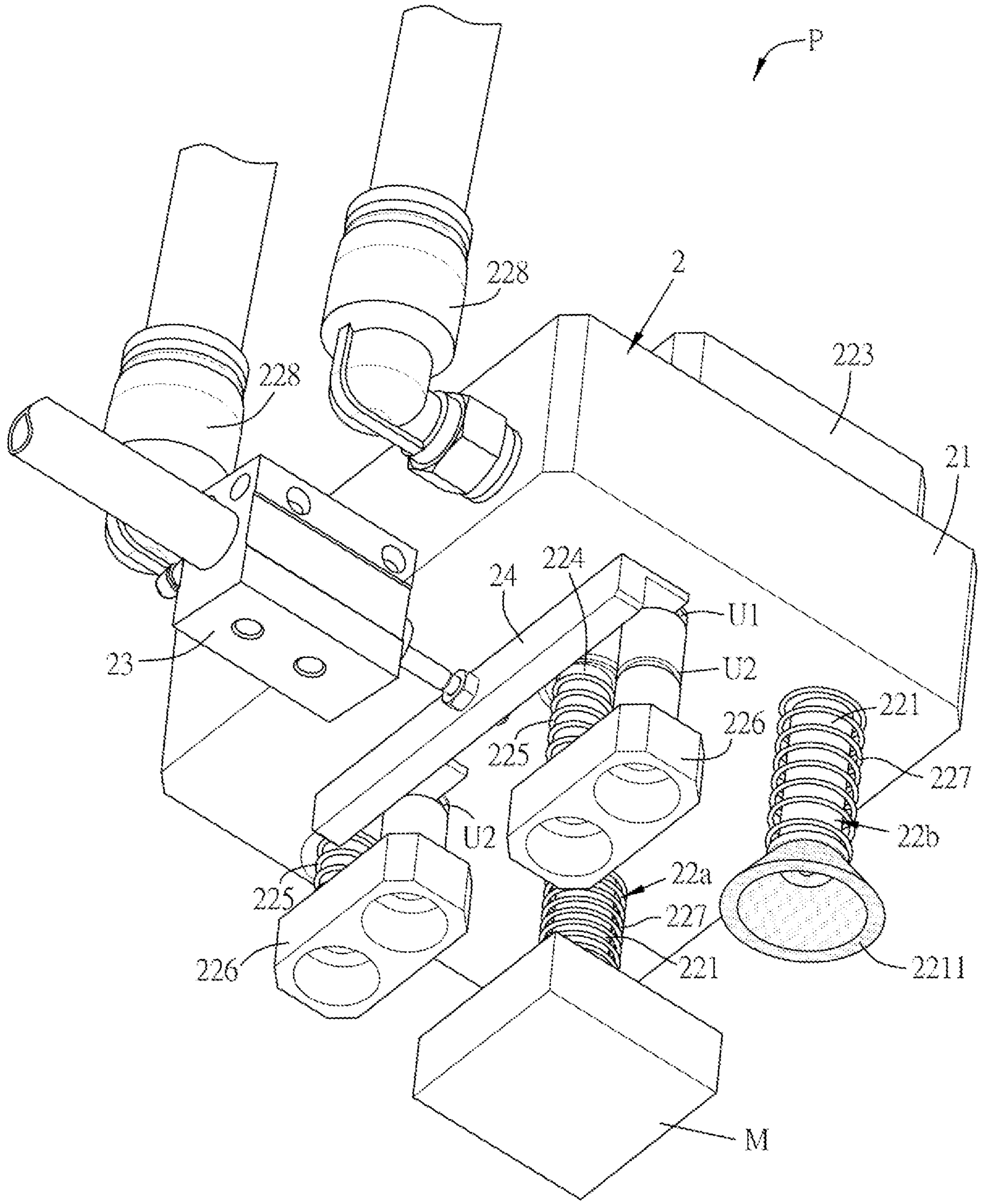
Figure 2C:
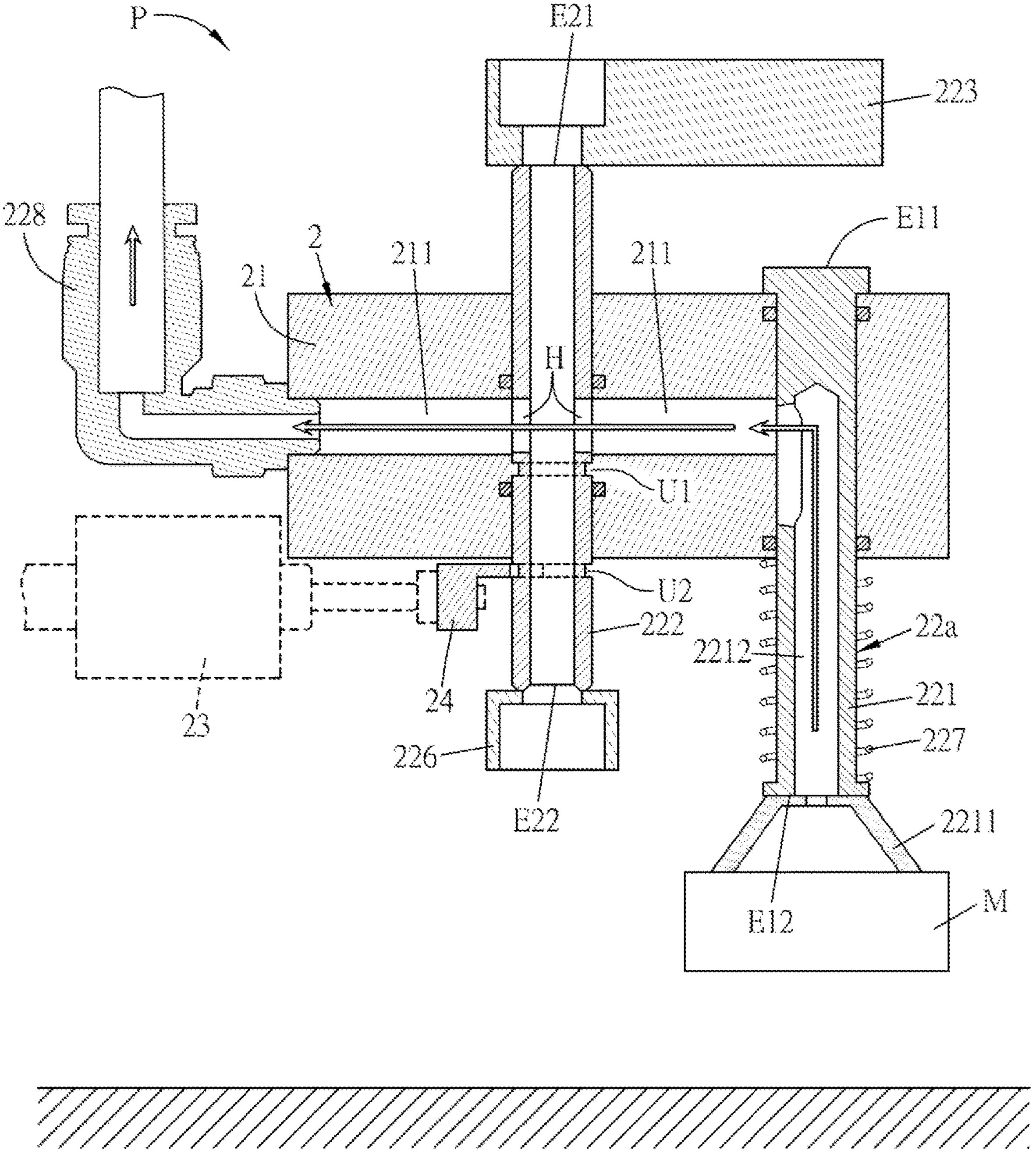

As shown in FIG. 2A to FIG. 2C, it is assumed that the picking assembly 22*a* is configured to absorb the material M, but the picking assembly 22*b* does not absorb the material M. When the picking mechanism 2 moves downwards (in the direction D1), the picking pieces 221 of the picking assembly 22A press the material M to push the blocking pieces 223 to move and drive the corresponding moving pieces 222 to move upwards (in the direction D2), the air vents H of the picking assembly 22*a* communicate with the corresponding air channels 211 (in FIG. 2A); and due to a fact that an air channel 2212 is formed in each picking piece 221, the vacuum source 1 enables the corresponding chucks 2211 to generate negative pressure through the corresponding air channels 211 of the main body 21, the air vents H of the moving pieces 222 and the air channels 2212 of the picking pieces 221 so as to absorb the material M. Then, as shown in FIG. 2A and FIG. 2B, the driving piece 23 may push the stopping piece 24 to move in the direction (direction D3) of the moving pieces 222 so as to clamp one (the clamping groove U2) of clamping grooves, and the air vents H of the moving pieces 222 and the corresponding air channels 211 of the main body 21 are kept in communication all the time. In this way, the direction D1 and the direction D2 above are opposite, and the direction D3 is perpendicular to the direction D1 and the direction D2. Therefore, as shown in FIG. 2C, even if the picking device P moves to other positions (such as a discharging position), and the blocking pieces 223 of the picking assembly 22*a* are separated from the first ends E11 of the picking pieces 221, the air vents H of the moving pieces 222 and the corresponding air channels 211 are still kept in communication, the picking assembly 22*a* may not push the moving pieces 222 back to the initial position due to the elastic force of the first elastic pieces 225 on the guide shafts 224, and the chucks 2211 may be kept in negative pressure all the time so as to absorb the material M.

Figure 3A:
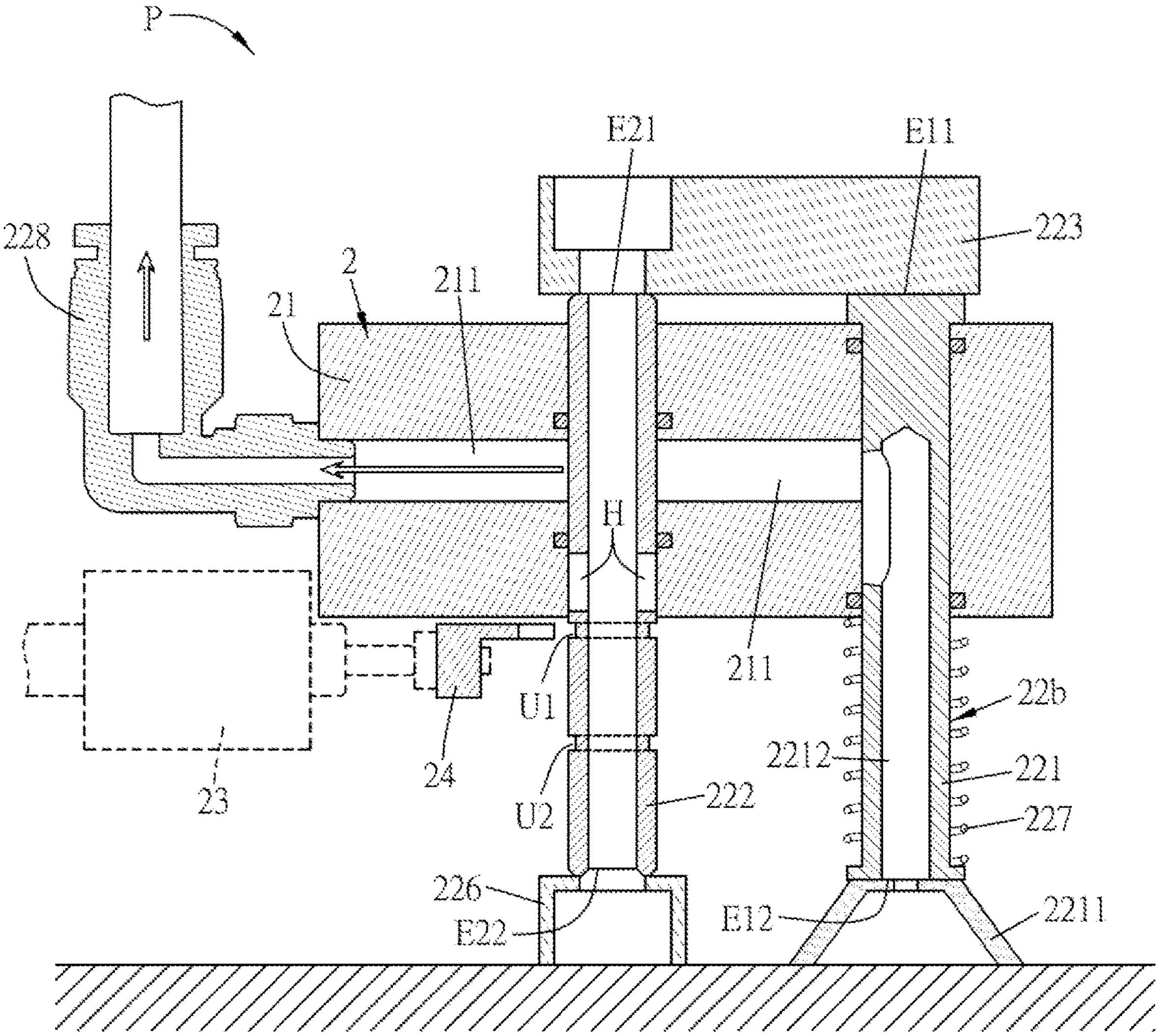
Figure 3B:
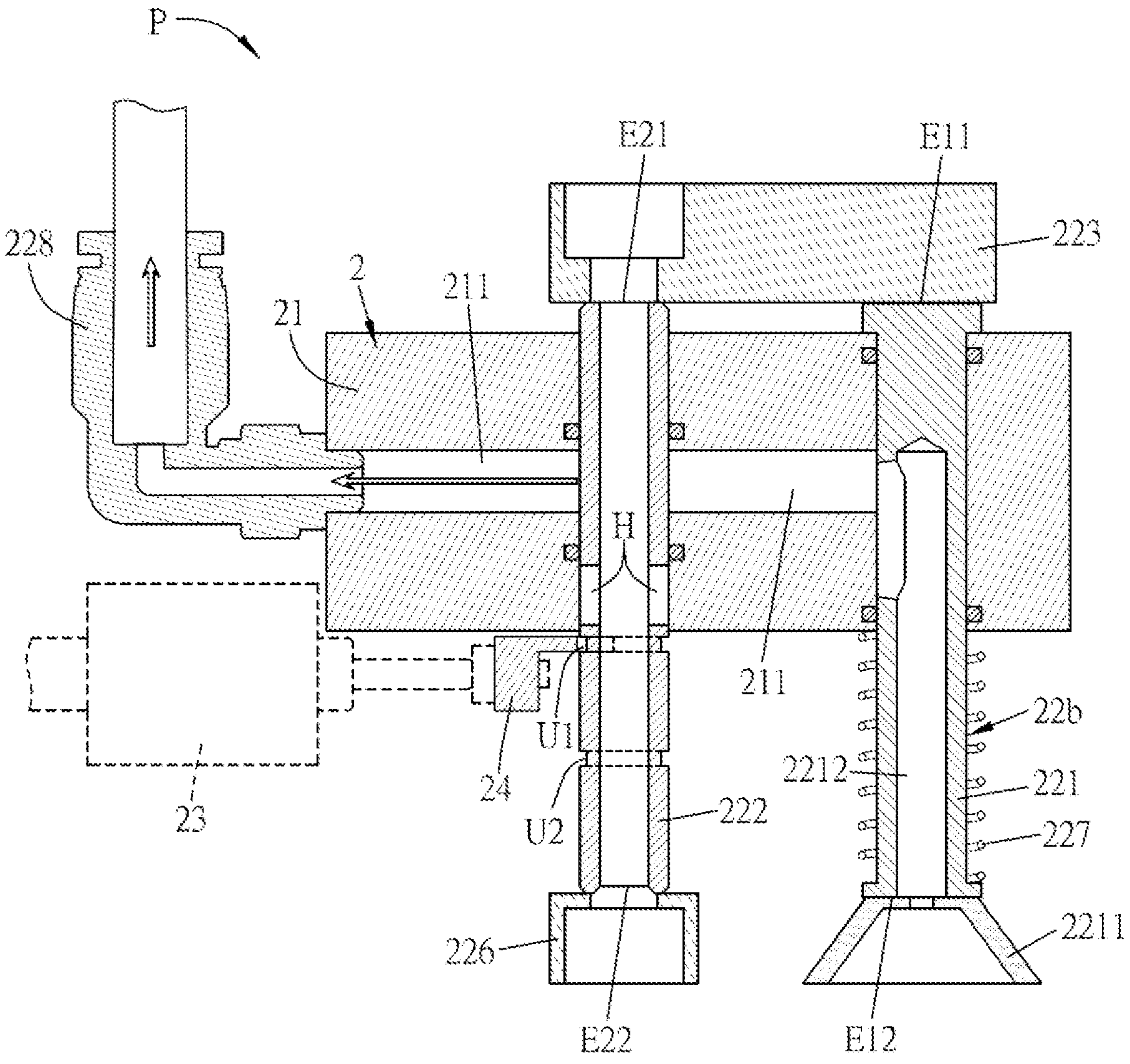

In addition, as shown in FIG. 3A and FIG. 3B, when the chucks 2211 of the picking assembly 22*a* press the material M, but the chucks 2211 of another set of picking assemblies 22*b* do not press the material M, the picking pieces 221, the blocking pieces 223 and the moving pieces 222 of the picking assembly 22*b* may not move upwards, but due to a fact that the chucks 2211 of the picking assembly 22*a* press the material M, the driving piece 23 pushes the stopping piece 24 to clamp the clamping grooves U2 (FIG. 2B) of the moving pieces 222 of the picking assembly 22*a*, and therefore the stopping piece 24 will clamp the clamping grooves U1 (FIG. 2B and FIG. 3B) of the moving pieces 222 of the picking assembly 22*b*, then the moving pieces 222 block the corresponding air channels 211, and the air vents H of the moving pieces 222 of the picking assembly 22*b* and the corresponding air channels 211 are kept in non-communication (namely, negative pressure cannot be generated by the chucks 2211); and therefore, the picking device P may achieve a function of self-determining whether the material M is at a picking position or not. Definitely, if the chucks 2211 of the picking assembly 22*b* also press the material M, the action process is the same as that of the picking assembly 22*a*, and no more description is made here.

In addition, if the picking device needs to reclaim materials with height difference, for example, two materials with height difference, and the first material is higher than the second material, this requirement can be met simply by increasing the quantity of the clamping grooves of the moving pieces of each set of picking assemblies. For example, the moving piece of each picking assembly may be provided with three clamping grooves, namely a first clamping groove, a second clamping groove and a third clamping groove in sequence from the position close to the main body to the position far away from the main body (from top to bottom); the first clamping groove may be used corresponding to the initial position (the air paths may not communicate with the chucks, and the chucks do not generate negative pressure); the second clamping groove may be used corresponding to the first material (higher) (the air paths may communicate with the chucks, and the chucks may generate negative pressure); the third clamping groove may be used corresponding to the second material (lower) (the air paths may communicate with the chucks, and the chucks may generate negative pressure); and the condition of absorbing the materials with different heights may be described with reference to FIG. 2A to FIG. 3B.

In conclusion, in the picking device according to the present disclosure, the vacuum source is configured to pump air so as to provide the negative pressure; the picking mechanism includes the main body and the plurality of picking assemblies which are movably arranged on the main body; the main body is provided with the plurality of air channels for connecting the vacuum source and the picking assemblies respectively; the picking pieces and the moving pieces of the picking assemblies penetrate through the main body at intervals and pass through the corresponding air channels; the blocking pieces of the picking assemblies are connected with the first ends of the picking pieces and the moving pieces respectively; the second ends of the picking pieces are provided with the chucks connected with the corresponding air channels; the moving pieces are provided with the air vents for moving along with the blocking pieces so as to communicate with the air channels; and when the picking pieces press the materials to push the blocking pieces and drive the moving pieces to move, and the air vents of the moving pieces communicate with the corresponding air channels, the vacuum source enables the chucks of the picking pieces to generate negative pressure through the air channels so as to absorb the materials. Therefore, in this structural design, the picking device according to the present disclosure can greatly reduce the used pipelines and wires, while meeting the requirements for productivity and cost reduction.

The above descriptions are illustrative only, not restrictive. Any equivalent modification or change made without departing from the spirit and scope of the present disclosure is to be included in the scope of the appended claims.

What is claimed is:

1. A picking device, suitable for absorbing at least one material, comprising:

a vacuum source configured to pump air to provide negative pressure; and a picking mechanism connected with the vacuum source, wherein the picking mechanism comprises a main body, and a plurality of picking assemblies which are movably arranged on the main body, the main body being provided with a plurality of air channels for connecting the vacuum source and the picking assemblies respectively, each picking assembly comprising a picking piece, a moving piece and a blocking piece, the picking pieces and the moving pieces penetrating through the main body at intervals and passing through the corresponding air channels, the blocking pieces being connected with first ends of the picking pieces and the moving pieces respectively, second ends of the picking pieces being provided with chucks which are connected with the corresponding air channels, and the moving pieces being provided with air vents which move alongside the blocking pieces to communicate with the air channels, when the picking pieces press the materials to push the blocking pieces and drive the moving pieces to move, and the air vents of the moving pieces communicate with the corresponding air channels, the vacuum source generates negative pressure through the air channels, enabling the chucks of the picking pieces to absorb the materials.

2. The picking device according to claim 1, wherein the blocking pieces are fixedly connected with the first ends of the moving pieces, and the blocking pieces are separately connected with the first ends of the picking pieces.

3. The picking device according to claim 1, wherein the picking mechanism further comprises a driving piece and a stopping piece, and the driving piece is connected with the stopping piece.

4. The picking device according to claim 3, wherein the moving pieces are further provided with a plurality of clamping grooves; and when the chucks of the picking pieces absorb the materials, the driving piece pushes the stopping piece to clamp one of the clamping grooves, and thus the air vents of the moving pieces are kept in communication with the corresponding air channels.

5. The picking device according to claim 3, wherein the moving pieces are further provided with a plurality of clamping grooves; and when the chucks of the picking piece do not press the materials, the driving piece pushes the stopping piece to clamp one of the clamping grooves, and thus the moving pieces block the corresponding air channels.

6. The picking device according to claim 1, wherein when the chucks of the picking pieces absorb the materials, and the blocking pieces are separated from the first ends of the picking pieces, the air vents of the moving pieces are still kept in communication with the corresponding air channels.

7. The picking device according to claim 1, wherein each picking assembly further comprises a guide shaft and a first elastic piece; and the guide shafts penetrate through the first elastic pieces, and two ends of the guide shafts are connected with the main body and the second ends of the moving pieces respectively.

8. The picking device according to claim 1, wherein each picking assembly further comprises a second elastic piece; and the picking pieces penetrate through the second elastic pieces.

9. The picking device according to claim 1, wherein each picking assembly further comprises an air pipe joint, and the air pipe joint is connected with the main body and communicates with the corresponding air channel.

10. The picking device according to claim 9, further comprising:

an air path distributor, the air path distributor being provided with a first outlet/inlet, and a plurality of second outlets/inlets which communicate with the first outlet/inlet respectively, the first outlet/inlet being connected with the vacuum source, and each second outlet/inlet communicating with the corresponding air channel of the main body through the corresponding air pipe joint.

* * * * *